3,243,475
POLYURETHANES

Artur Reischl, Leverkusen, Walter Simmler, Cologne-Mulheim, Erwin Müller, Leverkusen, and Konrad Ellegast, Leichlingen, Germany, assignors to Farbenfabriken Bayer Aktiengesellschaft, Leverkusen, Germany, a German corporation
No Drawing. Filed May 24, 1961, Ser. No. 112,194
Claims priority, application Germany, May 27, 1960, F 31,316; Apr. 22, 1961, F 33,739
18 Claims. (Cl. 260—824)

This invention relates generally to the preparation of polyurethanes and more particularly to a method of producing polyurethanes from polyesters having improved hydrophilic characteristics.

It has been proposed heretofore to prepare polyurethane plastics by a process in which a polyester is reacted with an organic polyisocyanate. In some of these processes a cross-linking agent or chain extender such as, for example, a dihydric alcohol is included in the reaction mixture. The polyurethane plastics prepared from polyesters as the resinous components of the reaction mixture have met with commercial success, but they are not entirely suitable for all purposes because of the hydrophilic nature of the polyesters and because the polyester can be saponified. Polyurethanes prepared from these polyesters are likewise unstable with respect to permanent hydrolytic influences.

It has been suggested that a silicon compound such as a dimethylsiloxane should be included in the preparation of some polyurethanes to act as a pore-regulating agent or stabilizer in a foamable reaction mixture. Such silicon compounds do not improve the resistance of the resulting polyurethane to hydrolysis. A radically branded polysiloxane-polyalkylene glycol ether has been used as a foam stabilizing agent in foamable reaction mixtures containing a polyalkylene ether glycol as the resinous component. These polyether-based polyurethanes do not present a problem because they are resistant to hydrolysis. Silicon compounds have also been used in the preparation of polyurethanes in the form of diphenylsilanediol as a cross-linking agent. Elastomers are sometimes prepared in this way from isocyanate-modified polyesters. It has been shown that while the diphenylsiloxanediol is supposed to act as a cross-linking agent, it actually reacts with —NCO groups to form a polysiloxane and water. The polyurethane is then cross-linked with the water and the polysiloxane remains in the polyurethane as a filler. The polysiloxane does not improve the resistance of the polyurethane to hydrolysis and has a tendency to exudate.

It is, therefore, an object of this invention to provide a method for making a polyurethane having improved hydrolysis resistance. Another object of the invention is to provide an improved method of making polyurethane plastics from polyesters. Still another object of the invention is to provide a method for making a polyurethane plastic from a resinous component which is principally a polyester which is devoid of the disadvantages of heretofore known processes. A more specific object of the invention is to provide a method for making a polyester polyurethane adapted to withstand hydrolytic degradation.

The foregoing objects and others which will become apparent from the following description are accomplished in accordance with this invention, generally speaking, by providing a process for making a polyurethane wherein the polyester is reacted with a polyisocyanate in a reaction mixture containing an organo silicon compound having at least one group containing hydrogen atoms reactive with an —NCO group and determinable by the Zerewitinoff method, the group containing the reactive hydrogen being bonded to a carbon atom which in turn is bonded directly to a silicon atom. In some embodiments of the invention, a cross-linking agent or chain extender such as a glycol or other polyhydric alcohol or polyamine is included in the reaction mixture. It has been found that a polyurethane more stable against hydrolytic influences can be prepared from a polyester provided that the reaction of the polyester with the polyisocyanate is effected in a medium containing an organo silicon compound of the average general formula

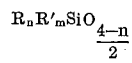

in which R represents a member consisting of hydrocarbon radicals free of aliphatic unsaturation of the group consisting of alkyl and aryl radicals and —X—Y groups; R' represents a divalent —X— radical linking together one Si-atom and one O-atom; at least some of said R's being hydrocarbon radicals and in case of $m=0$ at least one of said R's being an —X—Y— group; X being selected from the group consisting of alkylene and nitrogen-interrupted alkylene; Y being selected from the group consisting of —OH, —COOH, —NH$_2$, —NH(XOH), —N(XOH)$_2$, —(OX')$_q$OH,

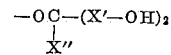

and

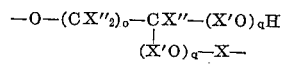

X' being an alkylene radical; X" being selected from the group consisting of hydrogen, alkyl and aryl radicals; $n$ having a value from 2 to 3; $m$ and $o$ being integers from 1–30 including zero; $q$ being an integer from 1 to 300. Otherwise expressed, according to the invention the reaction is effected in a medium containing an organo silicon compound containing the grouping:

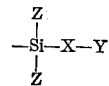

at least once or an organo silicon compound containing the grouping

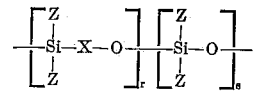

in which Z represents an alkyl, aryl, siloxyl, or siloxanyl radical; X represents alkylene or nitrogen-interrupted alkylene, otherwise expressed alkylene—[NX"-alkylene]$_p$; X" and Y have the above meaning; $r$ and $p$ represent whole numbers up to 30, $s$ is a whole number up to 300, and in which the sum of $r$ and $s$ is at least 2.

The common feature of the organo silicon compounds contemplated by this invention is the groups containing the reactive hydrogen linked to a silicon atom through an alkylene radical. At the time of the reaction of the polyester with the polyisocyanate, a reactive hydrogen containing group is present on the silicon compound, but as indicated by the second grouping shown above, the reactive hydrogen atom does not have to be present at the time the organo silicon compound is added to the reaction mixture. The letter X in the second grouping above represents an alkylene radical. When a compound containing this grouping is contacted by water, the Si-X-O bridges are split during the reaction with the diisocyanate to form a grouping containing reactive hydrogen. Splitting of this bridge is also effected by the presence of hydroxyl groups, carboxyl groups or ester groups in the reaction mixture. The groups containing the reactive hydrogen react with the —NCO groups during the polyurethane formation and the organo silicon compound becomes incorporated in the polyurethane molecule.

Any organo silicon compound containing reactive hydrogen bonded through an alkylene group to a silicon atom can be used in accordance with this invention. Typical compounds suitable for the purposes of this invention include:

$$HOH_2C-\underset{\underset{CH_3}{|}}{\overset{\overset{CH_3}{|}}{Si}}-O-\underset{\underset{CH_3}{|}}{\overset{\overset{CH_3}{|}}{Si}}-O-\underset{\underset{CH_3}{|}}{\overset{\overset{CH_3}{|}}{Si}}-CH_2OH$$

$$HOH_2C-\underset{\underset{C_2H_5}{|}}{\overset{\overset{C_2H_5}{|}}{Si}}-O-\underset{\underset{C_2H_5}{|}}{\overset{\overset{C_2H_5}{|}}{Si}}-O-\underset{\underset{C_2H_5}{|}}{\overset{\overset{C_2H_5}{|}}{Si}}-CH_2OH$$

$$HOH_2C-\underset{\underset{CH_3}{|}}{\overset{\overset{CH_3}{|}}{Si}}-\left[-O-\underset{\underset{CH_3}{|}}{\overset{\overset{CH_3}{|}}{Si}}-\right]_n O-\underset{\underset{CH_3}{|}}{\overset{\overset{CH_3}{|}}{Si}}-CH_2OH$$

wherein $n=0$ to 100 or more.

$$\begin{array}{c}HOH_2C-H_2C\\ HOH_2C-H_2C\end{array}\!\!\!\!N-CH_2-\underset{\underset{CH_3}{|}}{\overset{\overset{CH_3}{|}}{Si}}-O-\underset{\underset{CH_3}{|}}{\overset{\overset{CH_3}{|}}{Si}}-CH_2-N\!\!\!\!\begin{array}{c}CH_2-CH_2-OH\\ CH_2-CH_2-OH\end{array}$$

(Compound A)

$$NH_2-CH_2-\underset{\underset{CH_3}{|}}{\overset{\overset{CH_3}{|}}{Si}}-O-\underset{\underset{CH_3}{|}}{\overset{\overset{CH_3}{|}}{Si}}-CH_2-NH_2$$

$$HOH_2C-H_2CHN-CH_2-\underset{\underset{CH_3}{|}}{\overset{\overset{CH_3}{|}}{Si}}-O-\underset{\underset{CH_3}{|}}{\overset{\overset{CH_3}{|}}{Si}}-CH_2-NHCH_2-CH_2-OH$$

$$H_2NH_2C-\underset{\underset{CH_3}{|}}{\overset{\overset{CH_3}{|}}{Si}}-\left[-O-\underset{\underset{CH_3}{|}}{\overset{\overset{CH_3}{|}}{Si}}-\right]_n O-\underset{\underset{CH_3}{|}}{\overset{\overset{CH_3}{|}}{Si}}-CH_2NH_2$$

wherein $n=0$ to 100 or more;

$$HOOC-\underset{\underset{CH_3}{|}}{\overset{\overset{CH_3}{|}}{Si}}-\left[-O-\underset{\underset{CH_3}{|}}{\overset{\overset{CH_3}{|}}{Si}}-\right]_n O-\underset{\underset{CH_3}{|}}{\overset{\overset{CH_3}{|}}{Si}}-COOH$$

wherein $n=0$ to 100 or more.

$$HO-\underset{R}{\overset{}{CH}}-CH_2-\underset{R}{\overset{}{CH}}-O-CH_2-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_n-\underset{\underset{CH_3}{|}}{\overset{\overset{CH_3}{|}}{Si}}-CH_2-O-\underset{R}{\overset{}{CH}}-CH_2-\underset{R}{\overset{}{CH}}-OH$$

(Compound I)

wherein n=0 to 100 or more and R=hydrogen and methyl (1:1);

$$HO-(CH_2)_3-O-(CH_2)_3-O-CH_2-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_n-\underset{\underset{CH_3}{|}}{\overset{\overset{CH_3}{|}}{Si}}-CH_2-O-(CH_2)_3-O-(CH_2)_3-OH$$

(Compound II)

wherein $n=0$ to 100 or more:

$$CH_3-CH_2-\underset{\underset{CH_2-OH}{|}}{\overset{\overset{CH_2-OH}{|}}{C}}-O-CH_2-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_n-\underset{\underset{CH_3}{|}}{\overset{\overset{CH_3}{|}}{Si}}-CH_2-O-CH_2-\underset{\underset{CH_2-OH}{|}}{\overset{\overset{CH_2-OH}{|}}{C}}-CH_2-CH_3$$

(Compound III)

wherein $n=0$ to 100 or more.

$$H\!\!-\!\!\left[\!\!-O-CH_2-\underset{\underset{CH_2-OH}{|}}{\overset{\overset{CH_2}{|}}{C}}-CH_2-O-CH_2-\underset{\underset{CH_3}{|}}{\overset{\overset{CH_3}{|}}{Si}}-O-\!\!\left(\underset{\underset{CH_3}{|}}{\overset{\overset{CH_3}{|}}{Si}}-O\right)_{\!\!n}\!\!-\underset{\underset{CH_3}{|}}{\overset{\overset{CH_3}{|}}{Si}}-CH_2\!\!-\!\!\right]_{\!x}\!\!-OH(Br)$$

(Compound IV)

wherein $n=0$ to 100 or more and $x=1$ to 100 and more;

$$HOCH_2-\underset{\underset{CH_3}{|}}{\overset{\overset{CH_3}{|}}{Si}}-\left[-O-\underset{\underset{CH_3}{|}}{\overset{\overset{CH_3}{|}}{Si}}-\right]_n O-\underset{\underset{CH_3}{|}}{\overset{\overset{CH_3}{|}}{Si}}-CH_3$$

wherein $n=0$ to 100 or more.

$$H_2NCH_2-\underset{\underset{CH_3}{|}}{\overset{\overset{CH_3}{|}}{Si}}-\left[-O-\underset{\underset{CH_3}{|}}{\overset{\overset{CH_3}{|}}{Si}}-\right]_n O-\underset{\underset{CH_3}{|}}{\overset{\overset{CH_3}{|}}{Si}}-CH_3$$

wherein $n=0$ to 100 or more;

$$H_2N\underset{H}{\overset{H}{C}}-\underset{\underset{CH_3}{|}}{\overset{\overset{CH_3}{|}}{Si}}-O-Si-O-\underset{\underset{CH_3}{|}}{\overset{\overset{CH_3}{|}}{Si}}-CH_3$$

$$\begin{array}{c}HO(CH_2)_4\\ HO(CH_2)_4\end{array}\!\!\!\!N-CH_2-\underset{\underset{CH_3}{|}}{\overset{\overset{CH_3}{|}}{Si}}-O-\underset{\underset{CH_3}{|}}{\overset{\overset{CH_3}{|}}{Si}}-CH_2-N\!\!\!\!\begin{array}{c}(CH_2)_4OH\\ (CH_2)_4OH\end{array}$$

Examples of compounds suitable for this invention and having an alkylene radical bonded to a silicon atom which forms a grouping containing reactive hydrogen upon the splitting of an Si-X-O bridge include all compounds containing the following grouping:

$$-\!\!\left[\underset{\underset{CH_3}{|}}{\overset{\overset{CH_3}{|}}{Si}}-X-O\right]_r\!\!\left[\underset{\underset{CH_3}{|}}{\overset{\overset{CH_3}{|}}{Si}}-O\right]_s\!\!-$$

(Compound B)

wherein the ratio of $r$ to $s$ is 2 to 10.

Specific compounds of this type include:

$$CH_3\!\!-\!\!\left[\underset{\underset{CH_3}{|}}{\overset{\overset{CH_3}{|}}{Si}}-CH_2-O\right]_2\!\!\left[\underset{\underset{CH_3}{|}}{\overset{\overset{CH_3}{|}}{Si}}-O\right]_{10}\!\!-Si(CH_3)_3$$

$$CH_3\!\!-\!\!\left[\underset{\underset{CH_3}{|}}{\overset{\overset{CH_3}{|}}{Si}}-CH_2-CH_2-O\right]_4\!\!\left[\underset{\underset{CH_3}{|}}{\overset{\overset{CH_3}{|}}{Si}}-O\right]_{20}\!\!-Si(CH_3)_3$$

Any suitable organic polyisocyanate including those disclosed in U.S. Patent Re. 24,514 can be used in practicing this invention. These organic polyisocyantes can be aromatic, aliphatic or heterocyclic, but the aromatic diisocyanates are preferred. Some of the most preferred polyisocyanates are ethylene diisocyanate, propylene diisocyanate, tetramethylene diisocyanate, pentamethylene diisocyanate, octamethylene diisocyanate, undecamethylene diisocyanate, dodecamethylene diisocyanate, 3,3'-diisocyanato dipropylether, etc.; cyclopenthylene-1,3-diisocyanate, cyclohexylene-1,4-diisocyanate, 2,4-tolylene diisocyanate, 2,6-tolylene diisocyanate and mixtures 2,4- and 2,6-tolylene diisocyanate, xylylene-1,4-diisocyanate, xylylene-1,3-diisocyanate, 4,4-diphenylmethane diisocyanate, 2 - nitrodiphenyl-4,4'-diisocyanate, 4,4'-diphenylpropane diisocyanate, p-isocyanato benzyl isocyanate, m-phenylene diisocyanate, p-phenylene diisocyanate, naphthylene-1,4-diisocyanate, naphthalene-1,5-diisocyanate, furfurylidene diisocyanate, p,p',p''-triphenylmethane triisocyanate, diphenyl-4,6,4'-triisocyanate and reaction products of polyhydric alcohols with an excess of diisocyanate such as, for example, the reaction product of trimethylolpropane with an excess of toluylene diisocyanate. The polyisocyanate can also be a compound prepared from a phenol or malonic ester and a polyisocyanate. These compounds split under the conditions of reaction to release a polyisocyanate.

Any suitable polyester either linear or branched or any suitable polyesteramide can be used in accordance with this invention provided that the molecular weight is at least about 500, the hydroxyl number is not substantially more than 225 and the acid number does not substantially exceed about 10. Preferably the polyester has a molecular weight of about 500 to about 3,000 and has terminal hydroxyl groups. The polyester can be prepared by thermal esterification of any glycol such as, ethylene glycol, diethylene glycol or any other polyhydric alcohol such as trimethylolpropane, glycerine, sorbitol or the like with a polycarboxylic acid such as, for example, adipic acid, succinic acid, terephthalic acid, maleic acid, malonic acid or the like. An amino alcohol or diamine such as, for example, ethylene diamine or ethanol amine can be used in preparing the polyester. Hydroxy carboxylic acids or amino acids can be used. In fact any preparation of polyurethane plastics including U.S. Patent Re. 24,514 can be used in accordance with this invention.

The invention contemplates the preparation of polyurethanes by any known technique including casting processes, millable gum processes or the like. The polyurethane produced by this invention can also be used in making films, coatings and the like or for making adhesives or polyurethane foams. The elastomer produced by this invention can be used to make automobile tires, bearings and other machine parts, shoe soles and the like. Polyurethane foam can be used in upholstering for making chairs and various other articles of manufacture.

It is preferred to add the organo silicon compound to the reaction mixture at substantially the same time as the polyester and the polyisocyanate are mixed together. However, the organo silicon compound can be added at any time during the process.

A millable gum-type process for making elastomeric products is disclosed, for example, in U.S. Patent 2,621,166. A casting process is disclosed in U.S. Patent 2,729,618. A process for making coatings is disclosed in U.S. Patent 2,755,266. Any of the polyesters disclosed in these patents and any of the techniques disclosed therein can be used in practicing the instant invention.

In one embodiment of the invention, a polyester such as, for example, one prepared by esterification of an excess of ethylene glycol and adipic acid is mixed with approximately an equivalent amount of polyisocyanate and with one of the organo silicon compounds specified hereinbefore. The resulting mixture can be mixed with a suitable inert organic solvent therefor and used as a lacquer. In another embodiment, the polyester is mixed with the organo silicon compound and this mixture is then mixed with an excess of organic diisocyanate. The resulting product is then mixed with a suitable cross-linking agent such as a glycol, amine or water. The product can be cast in a mold to form a cast polyurethane. In still another embodiment, an isocyanate-modified polyester is prepared by using an excess of the polyisocyanate and this adduct is mixed with one of the organo silicon compounds and the polyurethane is cured. Sufficient silicon compound is used to act as the curing agent.

The organo silicon compound can be mixed with the chain extender or cross-linking agent and this mixture added to the polyester or to an isocyanate-modified polyester or to a mixture of a polyester with an organic polyisocyanate. In the millable gum-type process, a storable intermediate product is first produced by reacting the polyester with an excess of organic diisocyanate and sufficient chain-lengthening agent is added to produce an adduct having terminal hydroxyl groups. The storable adduct can be cured then or at a later time by adding additional organic polyisocyanate or sulfur, formaldehyde or an organic peroxide. In this process, the organo silicon compound can be included in the formulation which produces the storable adduct or it can be added later with the curing agent or cross-linking agent. As indicated hereinbefore, the organo silicon compound can also be added to a formulation which can produce a polyurethane foam. The organo silicon compound can be added substantially simultaneously with the mixing of the polyisocyanate and polyester or it can be added after the polyisocyanate has reacted with the polyester to form a prepolymer.

The amount of organo silicon compound used will vary with the particular technique employed and with the type of product desired. Hence, the invention contemplates all quantities of organo silicon compound. Preferably, however, the amount of organo silicon compound will be from about 0.2 percent to about 5 percent by weight based on the weight of polyester used. The invention is applicable to the use of polyesters which are ordinarily hydrophobic and are synthesized from polyhydric alcohols and carboxylic acids containing a relatively large number of carbon atoms. It is also applicable to other polyesters containing a relatively small number of carbon atoms such as, for example, polyesters prepared from ethylene glycol and adipic acid. In one embodiment of the process, the organo silicon compound can be incorporated in the polyester by including it as one of the components during the esterification. For example, an organo silicon compound having a plurality of hydroxyl groups can be used for esterification with the polycarboxylic acid to make the polyester.

The polyurethanes obtained according to the process of this invention have improved hydrolytic stability and have been found to be stable against hydrolytic degradation after aging for fourteen days at 70° C. and 95% humidity.

It is remarkable that this not only applies as regards those products of the process which are per se already more hydrophobic and have a high degree of hardness and elasticity, but also as regards soft and highly elastic products and also thin layers and two-dimensional sheet structures.

EXAMPLE 1

About 3 parts by weight of poly-(dimethylsilmethyleneoxane-dimethylsiloxane) copolymer (Compound B, viscosity $\eta$ 80 cst. at 20° C.) and about 100 parts by weight of a polyester of ethylene glycol and adipic acid (OH number 56, acid number 1) are heated for about 30 minutes to about 130 to about 140° C./12 mm. Hg while stirring.

Without further supply of heat, about 18 parts by weight of 1,5-naphthylene diisocyanate are added under atmospheric pressure at about 130° C., whereupon first of all the temperature drops, but rises again because of the exothermic reaction. After about 12 minutes, about 2 parts by weight of butane-1,4-diol are incorporated by stirring into the melt, which is at a temperature of about 125 to about 130° C., and the product is cast in molds at a temperature of about 110° C. The product is heated freely for about 24 hours at about 100 to about 110° C.

EXAMPLE 2

(a) About 1.5 parts by weight of the silicon compound according to Example 1 are heated as in Example 1 with about 100 parts by weight of the polyester referred to therein for about 30 minutes at about 130 to about 140° C./12 mm. Hg and reacted with about 30 parts by weight of naphthylene-1,5-diisocyanate.

After about 12 minutes, about 7 parts by weight of butane-1,4-diol are incorporated by stirring and the final heating time is about 24 hours at about 100 to about 100° C.

(b) About 0.5 part by weight of bis-($\beta,\beta'$-dihydroxyethylaminomethylene) - tetramethylsiloxane (Compound A) are used instead of about 1.5 parts by weight of the silicon compound according to Example 2(a) under otherwise unchanged processing conditions.

cooled after further 40 minutes at 125–145° to room temperature. It solidifies to give a wax-like mass.

*Table re Examples 1 and 2*

|  | A | | B | | C | | D | | E | |
|---|---|---|---|---|---|---|---|---|---|---|
|  | a | b | a | b | a | b | a | b | a | b |
| Example 1 | 279 | 267 | 673 | 713 | 6 | 14 | 72 | 69 | 38 | 40 |
| Comparison product without silicon compound | 288 | 124 | 624 | 555 | 7 | 33 | 78 | 79 | 46 | 38 |
| Example 2: | | | | | | | | | | |
| Example 2(a) | 306 | 272 | 550 | 550 | 29 | 39 | 88 | 90 | 41 | 42 |
| Example 2(b) | 294 | 258 | 590 | 545 | 41 | 65 | 90 | 91 | 43 | 43 |
| Comparison product without silicon compound | 266 | 78 | 630 | 50 | 46 | 2 | 95 | 95 | 47 | 36 |

In the tables:
 a=Without aging.
 b=After aging (14 days, 70° C. 95% air humidity).
 A=Tensile strength acc. to DIN 53504 (kg./cm.²).
 B=Breaking elongation (percent).
 C=Elongation 1 min. after tearing (percent).
 D=Shore hardness A acc. to DIN 53504.
 E=Elasticity (percent).

EXAMPLE 3

3 parts by weight of poly-(dimethylsilmethylene-oxane-dimethylsiloxane) copolymer (Compound B, viscosity $\eta$ 80 cst. at 20° C.) and about 100 parts by weight of a polyester of adipic acid, phthalic acid and trimethylolpropane (OH number 390) are heated for 30 minutes to 130° C. in the absence of moisture and while stirring.

100 parts by weight of this mixture are combined with 0.3 part by weight of a polysiloxane polyalkylene oxide copolymer, 1 part by weight of N-methyl-N'-(N-dimethylethyl)-piperazine, 5 parts by weight of sulfonated castor oil (50% water content) and 142 parts by weight of diphenyl methane-4,4'-diisocyanate. The mixture expands and results in a foam with good mechanical properties and a bulk density of 45 kg./m.³.

EXAMPLES 4–12 AND A–B

The silicon compound of the below table and the indicated amount of a polyester of ethylene glycol and adipic acid (OH number 56, acid number 1) are dehydrated while stirring for about 30 minutes at 130–140° C./12 mm. Hg. The indicated amount of 1,5-naphthylene diisocyanate are added at 130° C. After 15 minutes the indicated amount of 1,4-butane diol are admixed at 150° C. The reaction mixture is cast in molds. The elastomeric product can be taken from the mold after 15 minutes. It is freely heated for about 24 hours at 100–110° C.

*Table Examples 4 to 12 and A–B*

| Example | Silicon compound | Polyester | Diisocyanate | 1,4-butane diol |
|---|---|---|---|---|
| 4 | 0.5 I, n=8 | 100 | 30 | 14 |
| 5 | 1.5 I, n=8 | 100 | 30 | 14 |
| 6 | 1.5 I, n=100 | 100 | 30 | 14 |
| 7 | 1.5 I, n=300 | 100 | 30 | 14 |
| 8 | 1.5 II, n=10 | 100 | 30 | 14 |
| 9 | 12.5 II, n=10 | 82.5 | 30 | 14 |
| 10 | 25.0 II, n=10 | 75 | 30 | 14 |
| 11 | 1.5 II, n=10 | 100 | 18 | 2 |
| 12 | 0.5 III | 100 | 30 | 7 |

Silicon Compound III has the formula

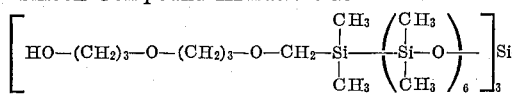

EXAMPLE 13

107.4 parts by weight of silicon Compound I (n=10) are heated to 125–130°; then 21 parts by weight of 1.5-naphthylene diisocyanate are incorporated while stirring and in the absence of moisture. After 25 minutes 200 parts by weight of an anhydrous polyester of ethylene glycol and adipic acid (OH number 56, acid number 1) are added. The reaction product (OH number 15) is 100 parts by weight of the above-mentioned polyester are combined with 5 parts by weight of the above reaction product (OH number 15). The mixture is dehydrated as in Example 4 and reacted with 30 parts by weight of 1,5-naphthylene diisocyanate and 14 parts by weight of 1,4-butane diol. The processing is as in Example 1. The final elastomer shows the physical properties given in the table.

EXAMPLE 14

In the procedure of Example 13 and under the very same conditions 18 parts by weight instead of 30 parts by weight of 1,5-naphthylene diisocyanate and 2 parts by weight instead of 14 parts by weight of 1,4-butane diol are employed. The resulting elastomers exhibits the mechanical properties listed in the table.

EXAMPLE 15

107.4 parts by weight of silicon Compound I (n=10) and 63 parts by weight of 1,5-naphthylene diisocyanate are reacted together for 30 minutes at 125°–130° C. A viscous adduct is obtained having free NCO groups (NCO content 10%).

100 parts by weight of the polyester of Example 13 are combined with 5 parts by weight of the above adduct (NCO content 10%) and dehydrated as in Example 4. The mixture is reacted with 58 parts by weight of 1,5-naphthylene diisocyanate and with 14 parts by weight of 1,4-butane diol. The reaction conditions are the same as in Example 4. The resulting elastomer has the properties listed in the table.

| Ex. | A | | B | | C | | D | | E | | F | |
|---|---|---|---|---|---|---|---|---|---|---|---|---|
|  | a | b | a | b | a | b | a | b | a | b | a | b |
| 4 | 368 | 214 | 505 | 418 | 19 | 24 | 44 | 39 | 94 | 93 | 42 | 44 |
| 5 | 332 | 271 | 415 | 440 | 11 | 17 | 36 | 31 | 89 | 91 | 38 | 41 |
| 6 | 285 | 205 | 553 | 425 | 46 | 31 | 57 | 44 | 95 | 95 | 48 | 43 |
| 7 | 254 | 225 | 502 | 485 | 36 | 37 | 46 | 44 | 95 | 94 | 48 | 41 |
| 8 | 298 | 242 | 569 | 530 | 42 | 50 | 56 | 50 | 95 | 92 | 46 | 49 |
| 9 | 248 | 230 | 450 | 482 | 23 | 32 | 49 | 42 | 94 | 93 | 41 | 45 |
| 10 | 204 | 199 | 343 | 420 | 11 | 20 | 33 | 30 | 91 | 90 | 35 | 36 |
| 11 | 298 | 233 | 593 | 738 | 6 | 19 | 36 | 18 | 75 | 72 | 47 | 45 |
| 12 | 317 | 252 | 545 | 575 | 28 | 35 | 53 | 41 | 94 | 92 | 43 | 45 |
| 13 | 237 | 234 | 410 | 440 | 21 | 28 | 52 | 49 | 95 | 94 | 44 | 48 |
| 14 | 266 | 236 | 580 | 650 | 6 | 14 | 55 | 44 | 78 | 79 | 45 | 48 |
| 15 | 257 | 227 | 503 | 505 | 31 | 39 | 53 | 51 | 95 | 93 | 42 | 45 |
| A | 266 | 78 | 630 | 50 | 46 | 2 | 46 | 30 | 95 | 95 | 47 | 36 |
| B | 288 | 124 | 623 | 555 | 7 | 33 | 35 | 11 | 78 | 79 | 46 | 38 |

In the table:
 a=Without aging.
 b=After aging (14 days, 70° C. 95% air humidity).
 A=Tensile strength acc. to DIN 53504 (kg./cm²).
 B=Breaking elongation (percent).
 C=Elongation 1 min. after tearing (percent).
 D=Ring structure (kg./abs.).
 E=Shore hardness A acc. to DIN 53505.
 F=Elasticity (percent).

It is to be understood that any of the other polyesters, polyisocyanates and organo silicon compounds disclosed herein as suitable compounds can be substituted in the foregoing examples for the particular materials used therein.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method for making a polyurethane plastic which comprises reacting a polyester prepared by esterification of a polycarboxylic acid and a polyhydric alcohol, said polyester having a molecular weight of at least about 500, an hydroxyl number of not more than about 225 and an acid number not substantially more than 10, with an organic polyisocyanate in a reaction mixture containing a silicon compound having the general formula

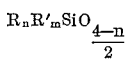

in which R represents a member selected from the group consisting of —X—Y groups and hydrocarbon radicals free of aliphatic unsaturation, said hydrocarbon radicals being selected from the group consisting of alkyl and aryl radicals; R′ represents a divalent —X— radical linking together one Si-atom and one O-atom; at least some of said R's being hydrocarbon radicals and in case of $m=0$ at least one of said R's being an —X—Y group; X is selected from the group consisting of alkylene and nitrogen-interrupted alkylene; Y is selected from the group consisting of —OH, —COOH, —NH$_2$, —NH(XOH), —N(XOH)$_2$, —(OX′)$_q$OH

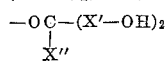

and

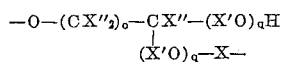

X′ is an alkenyl radical; X″ is selected from the group consisting of hydrogen, alkyl and aryl radicals; n has a value from 2 to 3; m and o are integers from 1–30 including zero and q is an integer from 1 to 300.

2. The process of claim 1 wherein the amount of compound having the silicon atom is from about 0.2 percent to about 5 percent by weight.

3. The method of claim 1 wherein the silicon compound contains a group having the formula

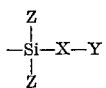

wherein Z is a member selected from the group consisting of an alkyl, aryl, and siloxyl.

4. The process of claim 3 wherein the organic polyisocyanate is selected from the group consisting of 1,5-naphthylene diisocyanate, 4,4′-diphenylmethane diisocyanate, tolylene diisocyanate and phenylene diisocyanate.

5. The method of claim 1 wherein the silicon compound contains a group having the formula

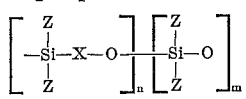

wherein Z is a member selected from the group consisting of alkyl, aryl, and siloxyl.

6. A method for making a polyurethane plastic which comprises reacting a polyester prepared by esterification of a polycarboxylic acid and a polyhydric alcohol, said polyester having a molecular weight of at least about 500, an hydroxyl number of not more than about 225 and an acid number not substantially more than 10, with an organic polyisocyanate in a reaction mixture containing bis-(beta, beta′-dihydroxyethylaminomethylene)-tetramethyl siloxane.

7. A method for making a polyurethane plastic which comprises reacting a polyester prepared by esterification of a polycarboxylic acid and a polyhydric alcohol, said polyester having a molecular weight of at least about 500, an hydroxyl number of not more than about 225 and an acid number not substantially more than 10, with an organic polyisocyanate in a reaction mixture containing a silicon compound having the formula

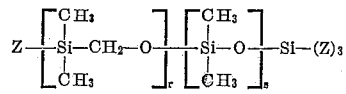

wherein Z is an alkyl radical, r and s are whole numbers, the sum of r and s is at least 6 and the ratio of r to s is 2 to 10.

8. A method for making a polyurethane plastic which comprises reacting a polyester prepared by esterification of a polycarboxylic acid and a polyhydric alcohol, said polyester having a molecular weight of at least about 500, an hydroxyl number of not more than about 225 and an acid number not substantially more than 10, with an organic polyisocyanate in a reaction mixture containing a silicon compound having the formula

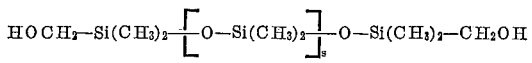

wherein s is an integer of from 0 to 100.

9. A method for making a polyurethane plastic which comprises reacting a polyester prepared by esterification of a polycarboxylic acid and a polyhydric alcohol, said polyester having a molecular weight of at least about 500, an hydroxyl number of not more than about 225 and an acid number not substantially more than 10, with an organic polyisocyanate in a reaction mixture containing a silicon compound having the formula

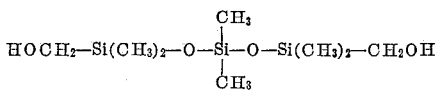

10. A method for making a polyurethane plastic which comprises reacting a polyester prepared from ethylene glycol and adipic acid and having an hydroxyl number of about 56 and an acid number of about 1, a compound having the formula

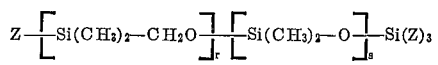

wherein Z is an alkyl radical, r and s are whole numbers, the sum of r and s is at least 6 and the ratio of r to s is 2 to 10, and an organic polyisocyanate.

11. A method for making a polyurethane which comprises reacting a polyester prepared from ethylene glycol and adipic acid and having a hydroxyl number of about 56 and an acid number of about 1, bis($\beta,\beta'$-dihydroxyethylaminomethylene)-tetramethylsiloxane and an organic polyisocyanate.

12. A polyurethane plastic obtainable by the process which comprises reacting a polyester prepared by esterification of a polycarboxylic acid and a polyhydric alcohol and having a molecular weight of at least about 500, an hydroxyl number of not more than about 225 and an acid number of not more than about 10, an organic polyisocyanate and an organo silicon compound having the average general formula

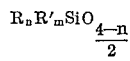

in which R represents a number consisting of hydrocarbon radicals free of aliphatic unsaturation of the group consisting of alkyl and aryl radicals and —X—Y groups; R′ represents a divalent —X— radical linking together one Si-atom and one O-atom; at least some of said R's being hydrocarbon radicals and in case of $m=0$ at least one of said R's being an —X—Y group; X being selected from the group consisting of alkylene and nitrogen-interrupted alkylene; Y being selected from the group consisting of —OH, —COOH, —NH$_2$, —NH(XOH)

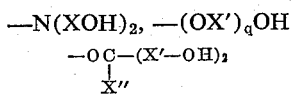

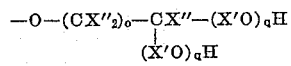

and

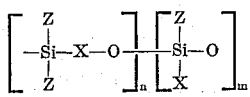

X' being an alkylene radical; X" being selected from the group consisting of hydrogen, alkyl and aryl radicals; $n$ having a value from 2 to 3; $m$ and $o$ being integers from 1–30 including zero; $q$ being an integer from 1 to 300.

13. The polyurethane plastic of claim 12 wherein the silicon compound contains a group having the formula

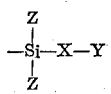

wherein Z is a member selected from the group consisting of alkyl, aryl and siloxyl.

14. The polyurethane plastic of claim 12 wherein the silicon compound contains a group having the formula $$\left[\begin{array}{c} Z \\ -Si-X-O \\ Z \end{array}\right]_n \left[\begin{array}{c} Z \\ -Si-O \\ X \end{array}\right]_m$$

wherein Z is a member selected from the group consisting of alkyl, aryl and siloxyl.

15. The product of claim 14 wherein the silicon compound is from about 0.2% to about 5% by weight based on the weight of polyester in the reaction mixture.

16. A polyurethane plastic obtainable by the process which comprises reacting a polyester prepared by esterification of a polycarboxylic acid and a polyhydric alcohol and having a molecular weight of at least about 500, an hydroxyl number of not more than about 225 and an acid number of not more than about 10, an organic polyisocyanate and an organo silicon compound having the formula

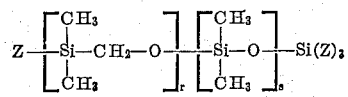

wherein Z is an alkyl radical, $r$ and $s$ are whole numbers, the sum of $r$ and $s$ is at least 6 and the ratio of $r$ to $s$ is 2 to 10.

17. A polyurethane plastic obtainable by the process which comprises reacting a polyester prepared by esterification of a polycarboxylic acid and a polyhydric alcohol and having a molecular weight of at least about 500, an hydroxyl number of not more than about 225 and an acid number of not more than about 10, an organic polyisocyanate and bis-(beta,beta'-dihydroxyethylaminomethylene)-tetramethyl siloxane.

18. A polyurethane plastic obtainable by the process which comprises reacting a polyester prepared by esterification of a polycarboxylic acid and a polyhydric alcohol having a molecular weight of at least about 500, an hydroxyl number of not more than about 225 and an acid number of not more than about 10, an organic polyisocyanate and an organo silicon compound having the formula

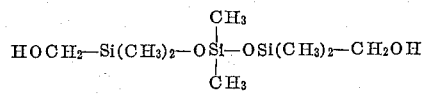

References Cited by the Examiner

UNITED STATES PATENTS

| | | | |
|---|---|---|---|
| 2,529,956 | 11/1950 | Myles et al. | 260—824 |
| 2,550,205 | 4/1951 | Speier | 260—46.5 |
| 2,924,581 | 2/1960 | Shorr | 260—45.6 |

FOREIGN PATENTS 736,953  9/1955  Great Britain.

SAMUEL H. BELCH, *Primary Examiner.*

WILLIAM H. SHORT, MURRAY TILLMAN,
*Assistant Examiners.*

UNITED STATES PATENT OFFICE
CERTIFICATE OF CORRECTION

Patent No. 3,243,475                          March 29, 1966

Artur Reischl et al.

It is hereby certified that error appears in the above numbered patent requiring correction and that the said Letters Patent should read as corrected below.

Column 4, line 63, for "cyclopenthylene" read -- cyclopentylene --; line 65, for "mixtures 2,4-" read -- mixtures of 2,4- --; line 67, for "4,4-diphenylmethane" read -- 4,4'-diphenylmethane --; line 69, for "naphthalene" read -- naphthylene --; column 5, line 22, after "any" insert -- polyester disclosed in various patents relating to the --; column 6, line 72, for "100° C" read -- 110° C --; column 7, in the first table, fourth column, line 2 thereof, for "624" read -- 623 --; same column 7, under the first table, line 7, thereof for "53504" read -- 53505 --; line 45, for "indioated" read -- indicated --; column 9, line 43, for "alkenyl" read -- alkylene --; column 11, lines 28 to 32, the right-hand portion of the formula should appear as shown below instead of as in the patent:

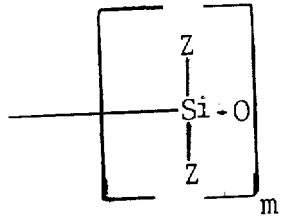

Signed and sealed this 22nd day of August 1967.

(SEAL)
Attest:

ERNEST W. SWIDER
Attesting Officer

EDWARD J. BRENNER
Commissioner of Patents